US006578762B1

(12) United States Patent
Knappmiller

(10) Patent No.: US 6,578,762 B1

(45) Date of Patent: Jun. 17, 2003

(54) PAYMENT ACCEPTING TRASH RECEPTACLE

(76) Inventor: Leonard V. Knappmiller, P.O. Box 136, Center Rutland, VT (US) 05736

(*) Notice: Subject to any disclaimer, the term of this patent is extended or adjusted under 35 U.S.C. 154(b) by 0 days.

(21) Appl. No.: 10/156,933

(22) Filed: May 29, 2002

(51) Int. Cl.$^{7}$ .............................. G06F 7/08; G06K 5/00

(52) U.S. Cl. ........................ 235/381; 235/380; 235/382

(58) Field of Search ................................ 235/379, 380, 235/381, 382; 232/43.1, 43.2; 220/201

(56) References Cited

U.S. PATENT DOCUMENTS 4,803,348 A * 2/1989 Lohrey et al. .............. 235/381
4,940,887 A * 7/1990 Sheng-Jung ................ 235/381
5,586,037 A * 12/1996 Gil et al. ..................... 705/407
6,010,239 A * 1/2000 Hardgrave et al. ......... 700/213
6,206,585 B1 * 3/2001 Walter ........................ 396/564

* cited by examiner

*Primary Examiner*—Thien M. Le
*Assistant Examiner*—April Nowlin
(74) *Attorney, Agent, or Firm*—Kevin Ellicott, Esq.

(57) ABSTRACT

A payment accepting trash receptacle including a hollow body having an interior space and a first opening, a receiving assembly pivotably mounted within the first opening, a payment acceptor attached to the hollow body, and an access restrictor cooperatively connected to the payment acceptor and receiving assembly for regulating access to the interior space.

20 Claims, 6 Drawing Sheets

PAYMENT ACCEPTING TRASH RECEPTACLE

CROSS REFERENCE TO OTHER APPLICATIONS

This is the first submission of an application for this article of manufacture. There are no other applications, provisional or non provisional.

FEDERALLY SPONSORED RESEARCH AND DEVELOPMENT

There are no federally sponsored or funded research or development projects or undertakings in any way associated with the instant invention.

BACKGROUND OF THE INVENTION

1. Field of the Invention

The instant invention relates to that field of devices consisting of articles of manufacture known as trash receptacles. Specifically, the instant invention is a payment receiving trash receptacle.

2. Background Information

The prior art known to the Inventors discloses that trash receptacles are well known throughout the arts. Trash receptacles are manufactured in a wide variety of shapes and sizes from smaller "waste baskets" through large industrial bins or dumpsters and truck mounted receptacle/compactors.

The instant invention is of the sort generally referred to as a "garbage can". In the prior art, trash receptacles of this sort are constructed of a fairly rigid or resilient material (metal or plastic) and include upright walls extending upwardly from a bottom wall, the walls defining a hollow interior space. It is within this hollow interior space that trash, garbage or other refuse is deposited for later disposal.

The trash receptacle is often left unattended in locations where it is advantageous to provide an opportunity for users to deposit their trash rather than have them simply place it on the ground or other undesirable locations. For example, it is well known that individuals using self-service car wash facilities will often clean out the interior of their car prior to using an available vacuum cleaner. Normally, the operator of the self-service car wash will provide a trash receptacle near the vacuum cleaner to encourage orderly disposal of trash by patrons rather than the undesirable tossing of trash onto the ground.

Unfortunately, the easy availability of the trash receptacle brings along with it a number of undesirable consequences. For example, it is a well known problem that such an unattended trash receptacle will often be sought out by those who wish to dispose of household and other trash without having to pay for disposal costs. These people will frequently collect the trash at their homes and businesses and take it to the location where the trash receptacle is and fill said receptacle to or beyond its capacity. This results in the eyesore of an overflowing trash receptacle, and potential health hazards associated with rotting food stuffs and other organic matter.

It is also well known throughout the arts that it is possible to construct devices which will accept payment prior to dispensing goods. For example, foodstuffs such as candy and snack foods, as well as beverages such as soda and juice are often housed within a machine which dispenses the goods after a customer has deposited the requisite payment.

Unfortunately, there has been no attempt to date to provide for an unattended trash receptacle capable of accepting trash from a user only after payment has been made.

SUMMARY OF THE INVENTION

The instant invention is a payment accepting trash receptacle. For the first time, it is possible to collect a fee for the use of a trash container, without the requirement that the trash container be attended by a person to collect that fee or payment. And although the instant invention is generally referred to as being a "trash" receptacle, it is entirely possible that it may be used to collect and store a wide variety of articles, including recyclables without departing from the scope of the claims.

A first object of the instant invention, therefore, is to provide for a trash receptacle capable of accepting payment for its use.

This objective is accomplished by incorporating an automated payment acceptor into the device. The automated payment acceptor may be electrical, mechanical, or electromechanical in nature.

A second objective of the invention is to provide a payment accepting trash container which may only be utilized after payment has been received by the device.

This objective is accomplished by incorporating an access restrictor mechanism that permits access to the interior of the device (where trash is deposited) only after the device has accepted payment from a user.

A third objective of the invention is to provide a trash container which may only accept a predetermined quantity of trash, so as to prevent unlimited deposit of trash in return for the payment received.

This objective is accomplished by incorporating a door through which the trash is deposited, and which has a form that inherently limits the volume of trash which may be placed within it before depositing the trash within the receptacle.

A fourth objective of the invention is to permit the trash receptacle to accept a variety of forms of payment including coins, currency, coupons, and electronic transfers of payment including credit cards and debit cards.

This objective is accomplished by including in the device a payment acceptor configured to accept the various forms of payment described immediately above.

A fifth objective of the invention is to provide a payment accepting trash receptacle capable of storing quantities of trash in excess of what would normally fit within the receptacle.

This object is accomplished by including in the device a trash compactor for reducing the volume of trash placed within the receptacle.

A DESCRIPTION OF THE DRAWINGS

A DESCRIPTION OF THE PREFERRED EMBODIMENT

Figure 1:
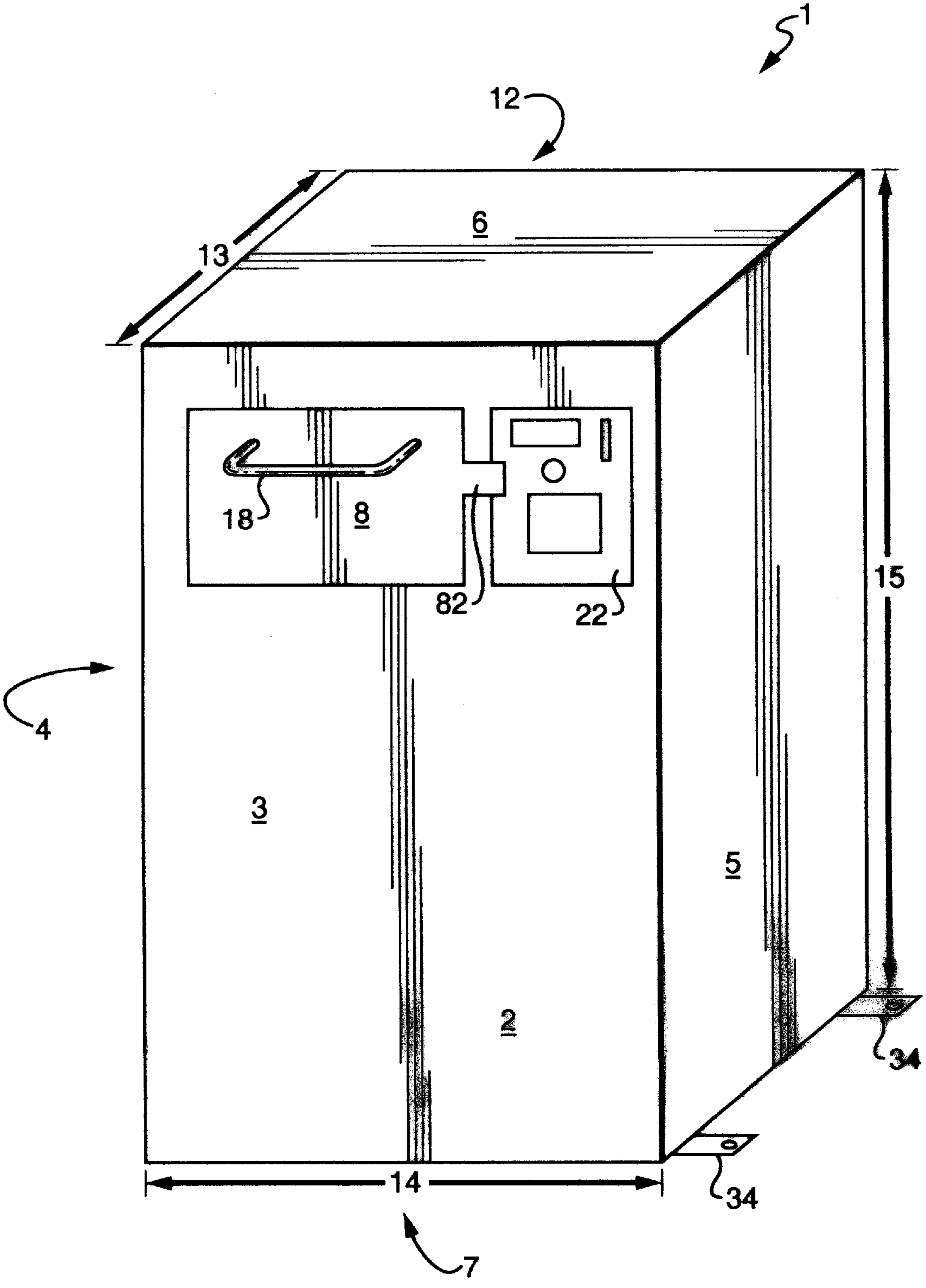
FIG. 1 is a perspective view of the preferred embodiment of the instant invention.
Figure 2:
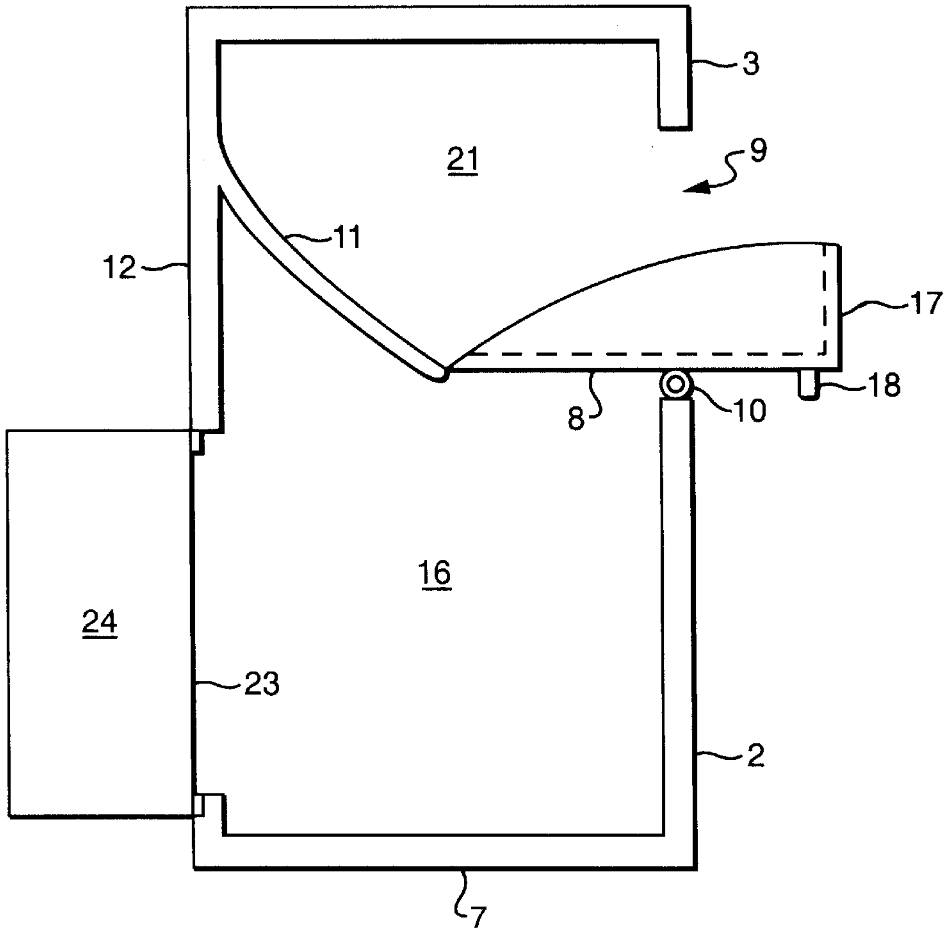
FIG. 2 is a cross sectional side view of the preferred embodiment of the instant invention.

As per FIGS. 1 and 2, a payment accepting trash receptacle (1), comprises, in the preferred embodiment, a solid walled, hollow body (2). In the preferred embodiment, the hollow body is box-like in shape, having a front wall (3), a left wall (4) adjacent to the front wall, a right wall (5) adjacent to the front wall and opposite and spaced apart from the left wall, a top wall (6) adjacent to the front wall, right wall and left wall, a bottom wall (7) adjacent to front wall, right wall and left wall, and opposite and spaced apart from the top wall (6), and a rear wall (12) opposite and spaced apart from the front wall, and adjacent to the left wall, right wall, top wall and bottom wall. Naturally, each wall has an inwardly facing side, and an outwardly facing side. Hollow, box-like bodies are well known throughout most art fields, being generally accepted as having spaced apart walls defining the hollow interior (in much the same manner as does a 6 sided, hollow, three dimensional box). Though the preferred embodiment contemplates a generally rectangular "box-like" body, the precise geometric form of the hollow body is unimportant. It could just as easily be cylindrical in form, in which case there would be one continuous sidewall, a top wall and a bottom wall. So long as the hollow body will accommodate the remaining components detailed below, the geometric form is a matter of esthetic preference, and does not constitute a claim limitation.

Furthermore, while the preferred embodiment of the instant invention includes a bottom wall (7), it should be understood that this wall is not a requirement. For example, it is entirely possible that the instant invention may be placed upon base such as a cement pad, in which case the cement pad would effectively serve as the bottom wall for the hollow body.

As with any three-dimensional body, the invention has length (13), width (14) and height (15). It is believed that the ideal dimensions for the preferred embodiment, when used, for example, at a self-service car wash, would be a length of approximately two feet, a width of approximately two feet, and a height of approximately three feet. However, these dimensions may easily be varied to accommodate different uses, and should not be considered limiting. For example, the dimensions set forth above might be ideal when the device is being used at a self-service car wash, while a much larger version of the instant invention might be desirable when used as a community trash disposal unit in an apartment house setting. It may further be considered that use of the instant invention might be possible in a common area of a neighborhood (e.g. a side alley), where it would be available for disposal of household waste in return for payment of a fee. In such a case, a commercial trash removal company might locate a much larger version of the instant invention to serve as a "community receptacle" or dumpster, and profit from the fees paid by the users of the community receptacle. Naturally, in such a case the hollow body would be considerably larger.

In the preferred embodiment, the hollow body is constructed from a rigid, relatively non-deformable, and strong material such as stainless steel. Though stainless steel is preferred in that it is difficult to cut into using ordinary "homeowner" tools (e.g. hacksaws and can openers) forged steel or iron could be substituted equally well. Furthermore, it is well known that various composite materials (e.g. carbon fiber based materials and laminates) may be formed into rigid and relatively non-deformable and strong sheet-like sidewalls or box shaped articles, and such composite materials would work equally well to accomplish the preferred embodiment. So long as the material chosen will render the hollow body difficult to open without authorization (e.g. break open or vandalize), the particular material chosen is unimportant and should not be considered as limiting.

As per FIGS. 1 and 2, The payment accepting trash receptacle farther has a first opening (9) through which trash must pass before being deposited within the interior (16) of the hollow body (2). While it is obvious that the hollow body must have a first opening through which trash may pass into the interior of the hollow body, it should be further readily apparent that there must be a component of the instant invention which is capable of blocking the first opening and preventing the insertion therethrough of trash until after payment has been received by the invention. Furthermore, this component should cooperate in the device to regulate the volume of trash, which enters the device before requiring additional payment for continued use. In the preferred embodiment, this is accomplished by the inclusion of a hopper or receiving assembly (8), which must be opened prior to placing trash within the receptacle. In the preferred embodiment, the first opening and the receiving assembly are located on the front wall (3). However, these could just as easily be located on the rear wall, or the left wall, or the right wall.

The receiving assembly permits the accepting of trash from a user of the device following payment, and prevents the accepting of trash unless and until such payment is received. While a great variety of receiving assemblies may be easily envisioned and substituted, the inventor believes that the ideal way to accomplish the goal of regulating the acceptance of trash is to incorporate one of the readily available mechanisms found within the arts of "mail boxes" and "bank depository doors". Perhaps the most simple and straightforward example of the former may be found in "Mail Box", U.S. Pat. No. 1,202,251, issued to J. H. Van Dorn, Deceased, on Oct. 24, 1916. In Van Dorn '251, a generally tamper-proof mail box is set forth on page 1, lines 36–106 and page 2, lines 1–29, the disclosure therein presented being herein incorporated by reference, along with FIGS. 2, 3, and 4. Van Dorn '251 discloses a "box body" and "cap" with "dome-like upward extension" which together are analogous to the hollow body (2) in the instant invention. Van Dorn '251 further discloses a "letter drop" which is pivotably connected to the "cap", said "letter drop" covering a "rectangular opening" when the "letter drop" is in the vertical or closed position. The letter drop in Van Dorn '251 is the analogue to the receiving assembly (8) in the instant invention, the "rectangular opening" is the analogue of the first opening (9) in the instant invention. As with the "letter drop" found in Van Dorn '251, the receiving assembly of the instant invention is pivotably attached to the hollow body via pivotable attachment means (10). Such pivotable attachment may be accomplished in the same manner as in Van Dorn '251, via a hinge bar having a cylindrical rib and cylindrical groove assembly, or in any other manner including, but not limited to, an axle attached to the receiving assembly fitted into brackets attached to the hollow body, a hinge (e.g. so-called "piano hinge") connecting the hollow body and receiving assembly together, or any other equivalent means. So long as the receiving assembly may be firmly and pivotably attached to the hollow body so that the receiving assembly may swing open and closed relative to the hollow body, the precise embodiment of pivotable attachment means is unimportant.

As per FIG. 2, the instant invention may further incorporate a rear wall projection (11). In an embodiment constructed as disclosed in Van Dorn '251, the rear wall projection extends downwardly from the rear wall and extends towards the front wall in an arc-like form. Though not disclosed in any great detail, the rear wall projection may be identified in FIG. 3 of Van Dorn '251, indicated as "a 6". The rear wall projection serves to prevent trash from being inserted into the hollow interior (16) while the receiving assembly (8) is in the open position. Clearly, in order to accomplish this goal, it is necessary that the rear wall projection have a width at least equal to the width of the receiving assembly, and extend sufficiently toward the front wall (3) so that the rear-most portion (33) of the receiving assembly is in close proximity to the rear wall projection whenever the receiving assembly is open.

Figure 3:
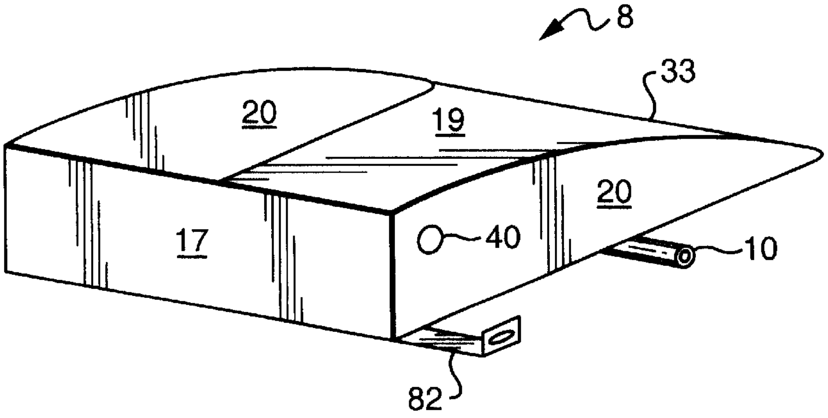
FIG. 3 is a perspective view of a receiving assembly.
Figure 4:
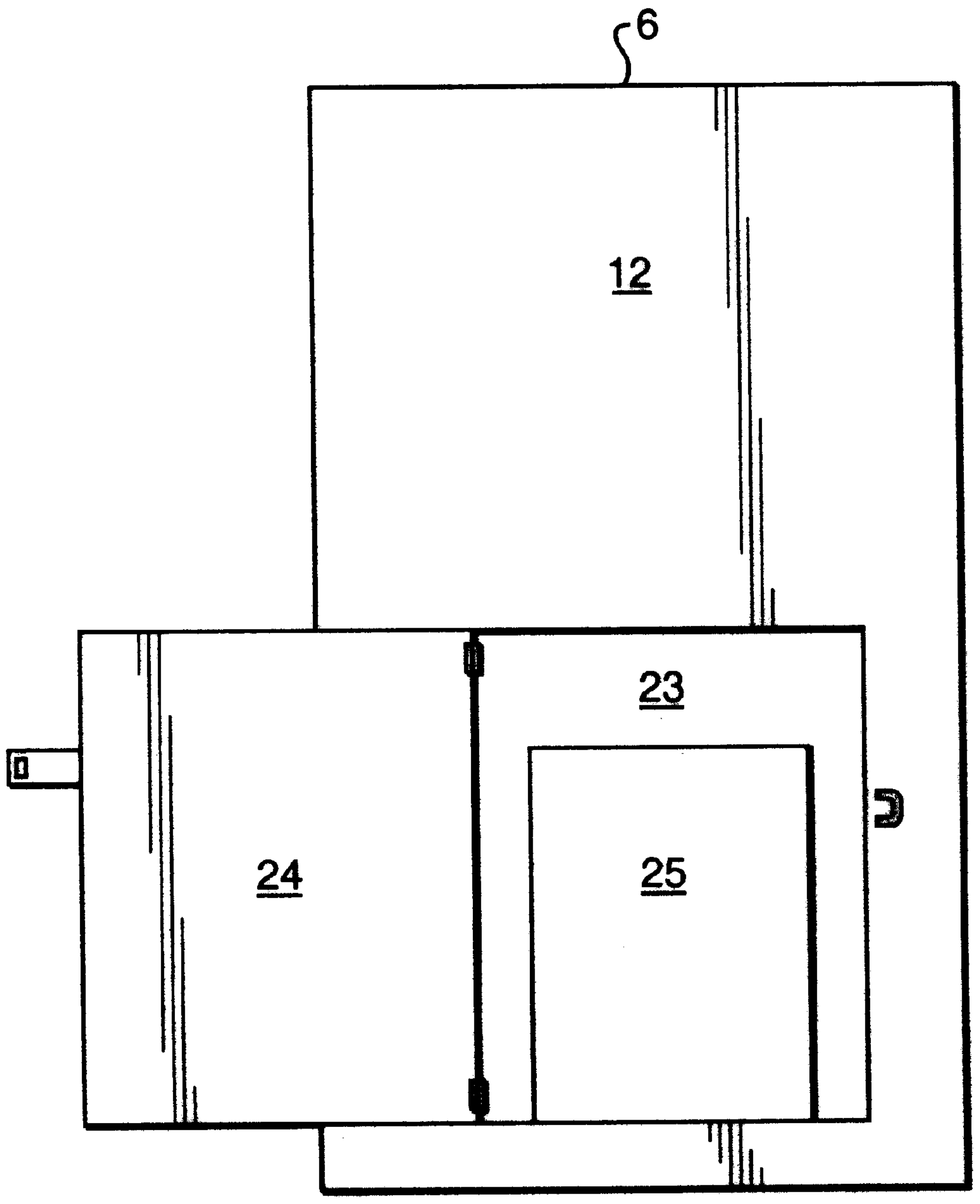
FIG. 4 is a rear elevational view of one embodiment of the instant invention.

It is also useful in the preferred embodiment of the instant invention to include a receiving assembly flange (17) extending upward from and perpendicularly to the receiving assembly, as is the flange indicated in Van Dorn '251 in FIGS. 3 and 4, indicated by "e 7". The width of the flange (17) should be approximately the same as the width of the receiving assembly. The exact dimensions of the flange are unimportant so long as, in combination with the rear wall projection, it prevents trash from being placed directly into the hollow interior of the body while the receiving assembly is open. Both the flange (17) and the rear wall projection (11) may be arc-like in form, or generally flat and sheet-like. Finally, as in Van Dorn '251, the receiving assembly should include a pull handle (18) located on the receiving assembly such that a user of the device may open the receiving assembly, by grasping the handle and pulling it toward the user.

Figure 5:
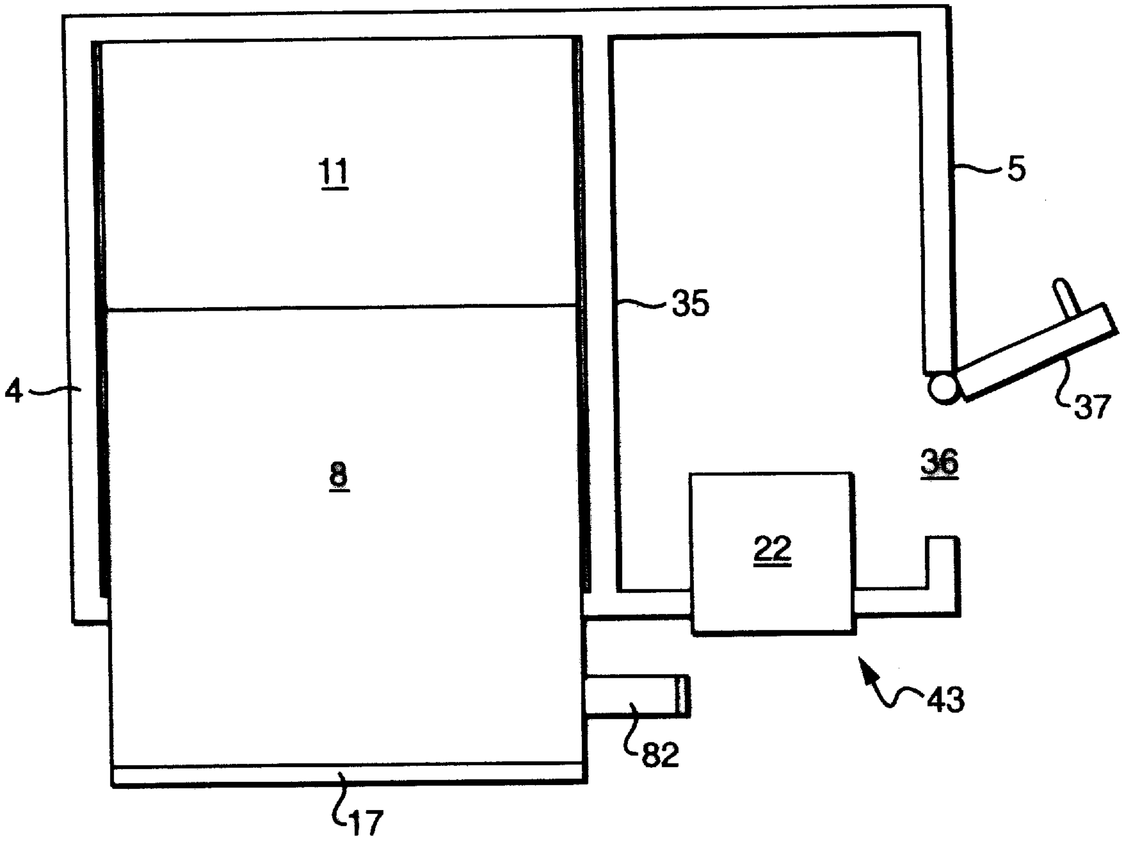
FIG. 5 is an overhead cross sectional view showing the interior of the instant invention.

As per FIG. 5, it may be useful in the preferred embodiment to include a baffle wall (35), parallel to though not co-planar with, the right wall (5), and extending from the bottom wall upwardly to the top wall, and extending from the front wall back to the back wall. Said baffle wall may be attached to any and or all of the aforementioned walls. The baffle wall would insure that the trash placed within the trash loading space (21) could not come into direct contact with the payment receiving means (22).

And while it is considered ideal to incorporate a receiving assembly which is configured in the manner disclosed in Van Dorn, '251, it is entirely possible that the receiving assembly could be somewhat more complicated, as that disclosed in "NIGHT DEPOSITORY CONSTRUCTION", U.S. Pat. No. 2,617,584, issued to H. C. Behrens on Nov. 11, 1952.

In Behrens '584, a generally tamper-proof night depository door of conventional construction is set forth on page 3, lines 54–75, page 4, lines 1–75, page 5, lines 1–75, page 6, lines 1–75, and page 7, lines 1–23, the disclosure therein, along with FIGS. 2, 3, and 4 being herein incorporated by reference.

Behrens '584 discloses a night depository for use in the exterior wall of a bank, including a frame (15), walls forming a hopper compartment (C), a door (28) pivotally mounted within a door frame opening (18) by usual means and a pull handle (28-1). Rather than mounting the depository in the wall of a bank, the instant invention mounts the analogous receiving means in the front wall of the hollow body (2). However, one could easily adapt the mechanism disclosed by Behrens '584 for use in the instant invention with no undue experimentation.

Behrens further includes vertical walls (35, 36) in the hopper, which may be useful in the instant invention, and could easily be adapted into the device as set forth in Van Dorn '251. The vertical walls would prevent trash from entering the hollow body without first passing between the rear-most portion of the receiving assembly and the rear wall flange. Furthermore, the vertical walls disclosed by Behrens '584 may be configured identically in the instant invention to include the curved outer edge (37), circularly curved portion (38) and rear straight portion (39). Finally, the hopper disclosed in Behrens '584 is pivotally connected to the depository via conventional means, just as the receiving assembly is pivotally connected to the hollow body in the instant invention. In Behrens '584 this is accomplished by a trunion (29) extending from a door frame side member and pivoting in the bore of a pivot bearing block (30) extending from the rear of the door (28). Such an arrangement would work equally well in the instant invention by attaching the trunions to the hollow body within the hollow interior (16) proximate to the first opening (9) and the pivot bearing block to the receiving assembly such that the receiving assembly may pivot open and closed relative to the hollow body (2).

Therefore, whether a simple receiving device as that disclosed in Van Dorn '251 is chosen, or a more complicated one such as that disclosed in Behrens '584 is chosen, the preferred embodiment of the device, as per FIGS. 1, 2 and 3 should include a receiving assembly (8) which is essentially a hopper having a bottom wall (19), a flange (17) attached to and perpendicularly disposed to the receiving assembly bottom wall, and a pair of vertical walls (20) attached to both the bottom wall (19) and the flange (17) and perpendicularly disposed to both the bottom wall (17) and the flange (17). It will be further understood that when pivotally mounted to the hollow body (2), the interior space of the hollow body defined by the rear wall projection (11), the inwardly facing sides of the front wall, left wall, rear wall, right wall, top wall, receiving assembly bottom wall (19), and receiving assembly vertical walls (20) together define a trash loading space (21). When the receiving assembly (8) is in its closed position, the trash loading space (21) is continuous with the hollow interior (16), thereby allowing the trash under the force of gravity to move from the trash loading space into the hollow interior (16) where it is stored until removed from the device. It is this trash loading space (21) that ultimately serves to limit the volume of trash that may be placed within the instant invention in return for the payment accepted. In practice, a user of the device, after tendering payment for use of the device, would grasp the handle (18) located on the receiving assembly, pivot the receiving assembly toward the user, thus providing access to the trash loading space, into which the user would then place trash for disposal. Clearly, the volume of trash that may be placed into the device is therefore limited by the volume of the trash loading space.

And while the preferred embodiment and a second embodiment are set forth above which may easily incorporate receiving assemblies which are well known throughout the arts of mail boxes and night depositories, it should be obvious that many other conventional assemblies may just as easily be substituted.

The precise assembly chosen to serve as the receiving assembly in the instant invention may be easily varied and still be considered within the scope of the claims set out hereafter, and without departing from the scope of said claims, so long as the receiving assembly is configured so as to perform the desired goals of accepting trash within the trash loading space (21) when the receiving assembly is open, preventing that trash from entering the hollow interior (16) until the receiving assembly is once again closed, and then delivering that trash from within the trash loading space into the hollow interior after the receiving assembly is closed such that the trash loading space is empty and can be opened for the insertion therein of additional trash (after additional payment has been received). Obviously, as the receiving assembly (8) is closed, gravity will act upon the trash deposited within the trash loading space, and it will tend to drop downwardly, away from the top wall (6) toward the bottom wall (7) or surface upon which the device is set, thus emptying the trash loading space.

Next, in order for the instant invention to function as intended, there must be a way to control access to the trash loading space and collect payment so that the device cannot be used without first providing payment for that use.

In the preferred embodiment, the instant invention includes a payment acceptor (the means for accepting payment) and an access restrictor (the means for restricting access to the trash loading space).

Fabricating the means for accepting payment and means for restricting access should create no special difficulty to those familiar with the aft of vending machines, for example. Such coin, token, currency, coupon, credit card, and debit card operated mechanisms are well known and may be seen incorporated into many vending devices such as soft drink, snack food, and news paper vending machines. A fine example of such a coin operated mechanism may be found in "ELECTROMECHANICAL COIN-OPERATED LATCH MECHANISM", U.S. Pat. No. 4,386,691, issued to R. C. Voegeli on Jun. 7, 1983. In Voegeli '691 there is disclosed a coin operated latch mechanism which would function excellently in the instant invention as both the means for accepting payment and the means for restricting access.

While the disclosure provided in Voegeli '691 would function well in the instant invention as the means for accepting payment and restricting access to the trash loading space, there are a tremendous number of equally feasible substitutes available within the vending and automated teller art fields. So long as the instant invention includes a payment acceptor, whether that means for accepting payment is mechanical, electrical, or electro-mechanical in nature, and so long as the means chosen for accepting payment cooperates to make the trash loading space accessible, the precise means chosen as the means for accepting payment is unimportant. For example, while the payment accepting mechanism disclosed in Voegeli '691 may easily be incorporated into the instant invention, a primarily electrical mechanism would work equally well. In such a case, the means for accepting payment might require both electrical power provided to the instant invention, as well as communication means such as a telephone wire or digital signal means (such as that used commonly in cellular phones, microwave transmitters and the like). While obviously more complicated than a simple mechanical means for accepting payment such as a coin acceptor, the underlying principal remains the same, to wit, accepting payment from a user of the device. The particular means for accepting payment which is incorporated into the instant invention may well include various user conveniences such as a read-out display panel for informing the user of the payment required in order to use the device, how much of that payment has been received, or even general operating instructions. Other conveniences could include change return controls and selection of payment form controls (e.g., selecting currency or coin or credit card).

Figure 8:
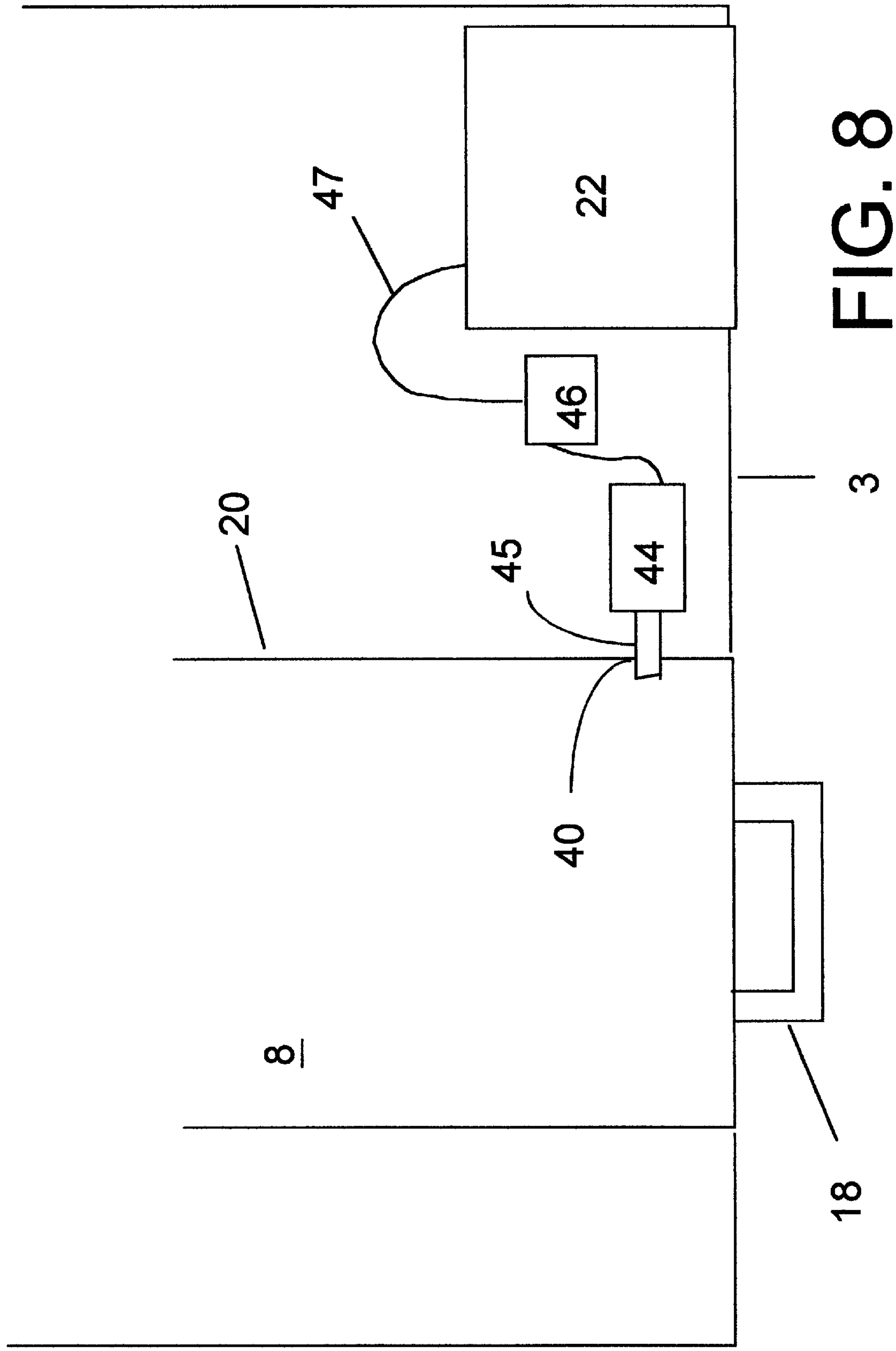
FIG. 8 is a partial plan view showing a means for restricting access.

Furthermore, as was noted above, the instant invention requires not only a means for accepting payment, but a means for restricting access to the hollow interior. As with the means for accepting payment, choosing and configuring the means for restricting access should require no undue experimentation in order to accomplish the instant invention. The vending machine art is replete with examples of means for restricting access until payment has been accepted. These examples range from the simple mechanical locking devices having a bolt which engages a bore or hole, to more complicated electro-mechanical, electrical, and even electro-magnetic locking mechanisms. As per FIG. 8, an extremely simple example of an electro-mechanical locking mechanism would include an electrically activatable solenoid (44) or actuator having a bolt (45) sized and shaped to extend through the hole having a bore (40) which passes completely through the vertical wall (20) most proximate to the means for accepting payment. The solenoid may be operably connected to the means for accepting payment through a relay (46) such that a signal sent from the means for accepting payment following the acceptance of that payment will energize the solenoid and the bolt be withdrawn from the hole having a bore, thus permitting the receiving assembly to be opened. Obviously, when operably connecting the solenoid to the means for accepting payment via a relay (whether that relay is electrical or electro-mechanical), it will be necessary to include electrical signal transmission means (47) such as suitable gauge wires. Irrespective of the particular mechanism chosen to act as the means for restricting access, so long as, following the acceptance of payment, the means for restricting access releases the receiving assembly so that trash may be inserted into the trash loading space, and then locks or latches again to restrict further access to the interior of the hollow body once the receiving assembly has been closed, the particular means for restricting access is unimportant. In fact, it should be obvious to those familiar with the relevant arts that a particular means for restricting access may be more or less desirable depending upon where the instant invention is to be located. For example, if the payment accepting trash receptacle is to be utilized in a common area of an apartment house, it may be desirable to include a means for accepting payment such as one capable of reading and charging to a credit card, and a mechanically operable means for restricting access such as lever having a bolt, the lever/bolt being released by the payment accepting means after payment has been received so that the bolt may be withdrawn from a hole having a bore (40) passing completely through one of the vertical walls of the receiving assembly, as in FIG. 3, thus allowing the receiving assembly to be opened.

While such a combination of means for accepting payment and restricting access to the interior of the hollow body may be useful in the shelter of an apartment house, it could potentially lead to premature failure of the instant invention in a location exposed to the elements, such as out in the open in an alley way behind the apartment house. Use of the instant invention outdoors may lead to inclusion of purely mechanical means for accepting payment and purely mechanical means for restricting access. This is not to say that if the instant invention is configured using electrical and or electro-mechanical components it cannot be used outdoors. Obviously if such components are to be used, they must be adequately protected within the device to ensure their continued operation despite the instant invention's exposure to the elements. In its most rudimentary form, this could be as simple as encasing the electrical components within a plastic sheeting sheathe, or even installing only components which have been fabricated for use in environments exposed to moisture, heat and cold.

It should also be made perfectly clear that while the instant invention has been described as including means for accepting payment and means for restricting access, it is not required that the two components be separate and individual. That is, it is well known in the vending arts, for example that the means for accepting payment may be fabricated to incorporate the means for restricting access as well. This is commonly accomplished by including an electrical motor, or servo mechanism or actuator mechanism which is activated by the acceptance of payment from a user of the device, and which in turn, once activated, releases a latch, bolt or similar component so that a door or cover may be opened, providing access to the article which has just been paid for (or in the case of the instant invention, providing access to the trash loading space).

It is well known throughout the vending art that means for accepting payment may be hingeably or removably attached to the hollow body such that access may be had to the internal and working components of the payment accepting means as well as the payment collected and stored by the payment accepting means, by authorized personnel. Mounting the means for accepting payment in the hollow body may easily be accomplished by having the hollow body include a fourth opening (43), preferably on the front side, proximate to the first opening, into which the means for accepting payment may be mounted, as per FIG. 5. It may be so mounted permanently, or hingably as noted above. When permanently or immovably mounted, the payment accepting means (22) may be accessed for servicing or retrieving payments through a third opening (36) passing through, for example, the left side (5), and further having a means for accepting payment access panel (37) sized and shaped to cover the third opening, the access panel being preferably pivotably attached to the hollow body via a hinge or similar means, and finally including access panel locking means such as a locking latch or other common locking means to prevent unauthorized access to the interior of the hollow body through the third opening.

Solely for purposes of adequacy of disclosure, and with no limitations thereby implied, the instant invention will now be described in the first embodiment as incorporating the mechanism disclosed in Voegeli '691.

In Voegeli '691 is disclosed, a newspaper vending machine including a box-like article housing forming a compartment in which newspapers are stored and having a door pivotably attached to it via a hinge, the door having a handle and providing access to the compartment, a latch mechanism housing and coin receiving box mounted on the article housing, the door handle further having a tongue portion for engaging the latch mechanism, the latch mechanism being configured for the acceptance of payment and release of the door, thereby granting access to the compartment following payment. This mechanism is fully set forth on page 4, lines 31–68, page 5, lines 1–68, page 6, lines 1–68, page 7, lines 1–68, page 8, lines 1–68, page 9, lines 1–68, page 10, lines 1–68, page 11, lines 1–68, page 12, lines 1–68, and page 13, lines 1–37, and that disclosure is herein incorporated by reference. And while the Voegeli '691 disclosure includes components and circuitry for varying the payment necessary to release the door (accounting for the differing costs of newspapers on weekdays and Sundays), these components and circuitry are not required for the instant invention. So long as the analogous components are present which permit the door to be opened following acceptance of payment, then re-latch the door once the door is closed, the instant invention will operate as intended.

The instant invention may incorporate a nearly identical latching mechanism by merely adapting the receiving assembly (8) to include the Voegeli '961 latch lock (shown on sheet 7, FIG. 9, label 82 of Voegeli '961). As per FIG. 3 in the instant invention, the precise location of the latch lock (82) is unimportant and will function as desired'so long as it can engage the latching mechanism when the receiving assembly is closed, thus restricting access to the trash loading space (21) until after payment as been received.

It has been indicated that the instant invention need include a means for accepting payment, and that the means for accepting payment may be fabricated in nearly any number of ways so long as it can accept payment, and cooperate to allow the receiving assembly to be opened. Thus far, while the invention has been described as being capable of accepting payment forms including coins, tokens, currency, coupons, credit and debit cards, only a coin mechanism has been disclosed in any detail.

A fine example of a means for accepting payment which will allow the use of currency, coupons and/or debit/credit cards in the instant invention is provided for in "METHOD AND APPARATUS FOR THE CONTROL OF A MULTIPLE DOOR ACCESSIBLE NEWSPAPER VENDING CABINETS WITH A SINGLE VEND CONTROL MECHANISM OPERTATING REMOTE DOOR LATCHES", U.S. Pat. No. 5,360,093 issued to S. Baer on Nov. 1, 1994.

Figure 6:
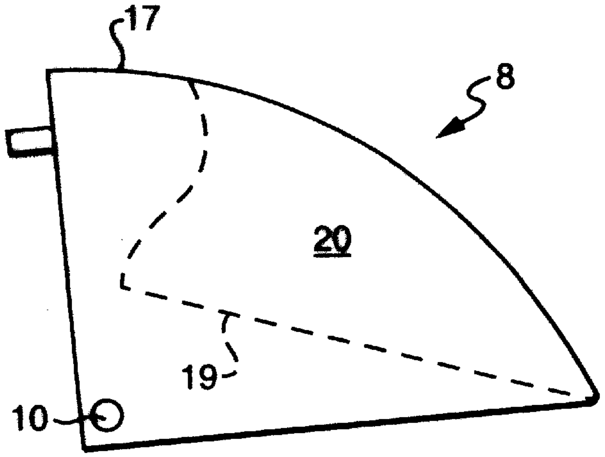
FIG. 6 is aside elevational view of another embodiment of the receiving assembly.

According to Baer '093, the disclosure of which is herein incorporated by reference on page 4, lines 51–65 a rack having walls defining a body mounted on legs includes a vend control module. On page 4, line 67–68, and page 5, lines 1–10, it is further disclosed that the rack has a door for accessing the interior of the rack, and the vend control mechanism is capable of accepting coinage, paper money, debit/credit cards. The vend control mechanism is set forth in detail on page 64 lines 25–68, and page 7, lines 1–62. As is desirable in the instant invention, the invention disclosed in Baer '093 will function adequately as both the means for accepting payment and the means for restricting access. In Baer '093, the analogue to the instant invention's means for restricting access is set forth in detail on page 9, lines 46–68, page 10, lines 1–68, and page 11, lines 1–24. It will require no experimentation whatsoever to incorporate the Baer '093 mechanism into the instant invention such that the mechanism will function as the means for accepting payment and means for restricting access. Obviously, while Baer '093 contemplates controlling more than one door, when configured to operate in the instant invention, it need control only the receiving assembly (8). Furthermore, so much of the latching and locking mechanism disclosed in Baer '093 could be incorporated into the instant invention as is required to allow the receiving assembly to be opened after payment has been received, and latch/lock the receiving assembly in the closed position after the receiving assembly has been closed again. The required locking/latching mechanism components of Baer '093 may be quickly and easily identified as incorporated by reference above, and with review of the Baer '093 drawings, specifically FIGS. 5, 6, and 7 which are also incorporated by reference herein. Obviously, the locking slot (90) disclosed in Baer '093 is the analogue of the hole having a bore (40) and or the latch lock (82) in the instant invention.

The incorporation of Baer '093 herein should in no way limit the means for accepting payment or means for restricting access set forth in the claims. Incorporation of Baer '093 is merely provided to enable one to practice the instant invention with absolutely no experimentation whatsoever.

However, the routineer in the art will immediately recognize that a wide variety of mechanical, electro-mechanical, electro-magnetic and electrical components could easily be substituted to perform the task of acting as means for accepting payment and means for restricting access in the instant invention without undue experimentation being required.

As per FIGS. 1 and 2, the instant invention thus far described includes a hollow body (2) having a first opening (9) in which is pivotably connected a receiving assembly (8) for accepting trash once payment has been received by means for accepting payment (22), the receiving assembly further being kept latched and closed until after payment has been received and the means for restricting access to the interior has been induced to release the receiving assembly so that the receiving assembly may once again be opened for the insertion therein of more trash.

However, it should be further apparent that the device will soon cease to be useful for its intended purpose unless there is provided a way to remove the accumulated trash from within the hollow interior (16). To this end, there should be provided for in the preferred embodiment a second opening (23) for accessing the hollow interior (16). In the preferred embodiment, as per FIG. 2, the second opening (23) passes completely through the rear wall (12) allowing access to the hollow interior (16). A rear wall door (24) sized and shaped to completely cover the second opening is pivotally attached to the back way via suitable means such as hinges so that the rear wall door may be opened and trash removed from within the hollow interior, and then closed so that the hollow interior is no longer accessible through the second opening. Given that it is important to permit the insertion of trash into the device only through the trash receiving assembly after payment has been received, there should be rear wall door securing means included in the instant invention. Such rear wall securing means could be as simple as a hasp/latch and padlock permitting the locking of the rear wall door to the rear wall and thus preventing access through the rear wall by anyone other than those who can open the lock.

Finally, as per FIG. 4, it is believed that it may be useful to include some form of removable receptacle (25) within the hollow interior into which trash falling from the trash loading space (21) may accumulate. This may be accomplished most easily by including a trash bin sized and shaped to fit through the second opening and residing within the hollow interior (16). The trash bin in the preferred embodiment need be nothing more than a box-like hollow container having five spaced apart walls and an open top such that trash falling from above the trash bin will be deposited and contained within it. Thus, the removable receptacle will collect and contain the trash that falls from the trash loading space, into the hollow interior (16). The removable receptacle (25) may later be removed through the second opening for appropriate disposal of the trash contained therein, and the once again empty removable receptacle may be replaced within the hollow interior for continued collection of trash.

Furthermore, as per FIG. 1, it may be useful to include means for securing the hollow body to the surface upon which it is placed. This assures that the device is not stolen or otherwise moved from the chosen location. Such means for securing the hollow body to the surface upon which it is placed may be as simple as a plurality of tabs (34) attached to the hollow body, proximate to the bottom side (7). The tab may have a hole passing completely therethrough to permit a fastener such as a bolt or screw to extend through the tab and be fastened to a base (e.g., the surface upon which the device is placed). And while tabs are utilized in the preferred embodiment, clearly other means for securing the hollow body to the surface upon which it is place would work equally well, so long as the device is thereby secured to the surface upon which it is placed.

A complete description of the operation of the preferred embodiment may now be given. A user of the device who wishes to dispose of trash may provide payment via the means for accepting payment. The payment having been received, the means for restricting access to the interior releases the receiving assembly so that it may be opened, providing access to the trash loading space. The user of the device places trash within the trash loading space and then closes the receiving assembly. Once the receiving assembly has been closed, two things take place: first, the receiving assembly is once again latched in its closed position by the means for restricting access to the interior such that no additional trash may be placed within the trash loading space until another payment has been received by the payment accepting means; second, the trash in the trash loading space will fall downwardly into the hollow interior, preferably into the removable receptacle where it accumulates until the removable receptacle is withdrawn from within the hollow interior through the second opening for appropriate disposal.

Figure 7:
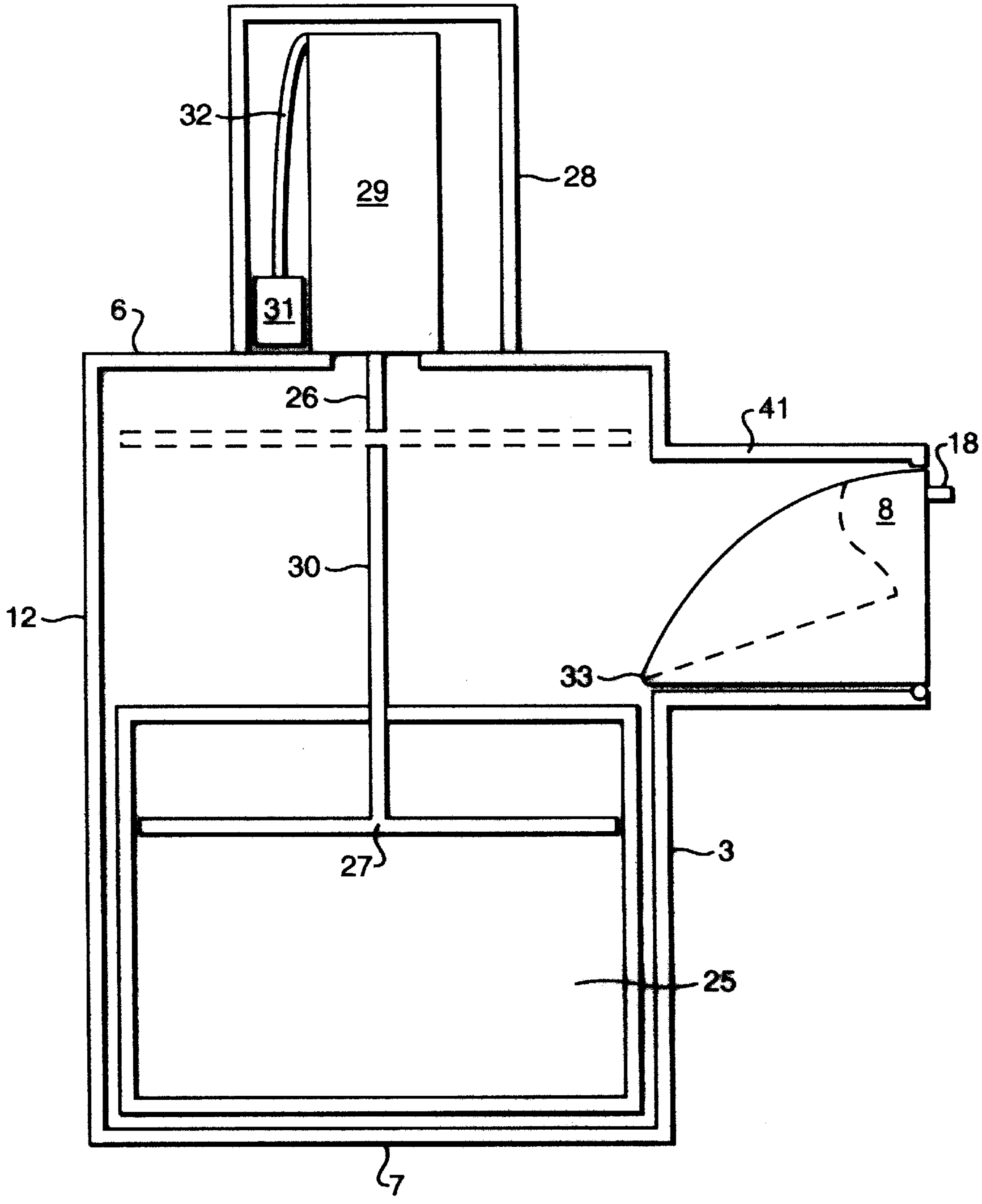
FIG. 7 is a cross sectional side elevation view of another embodiment of the instant invention.

In a third embodiment of the instant invention, as per FIG. 7, the instant invention may be configured to include trash compaction means (26). The inventor believes that this may easily be accomplished by increasing the height (15) of the device sufficiently to include the compaction means, or, as per the third embodiment of the invention as shown in FIG. 7, increase the height (15) of the hollow body, and include a second hollow body (28) atop the hollow body in which the majority of the compaction means may be mounted and stored. The third embodiment should further include a compaction plate (27), fabricated from a strong and nondeformable material (e.g. steel or iron) which will come into contact with the trash that has been deposited within the hollow body (2). The compaction plate should be sized and shaped so as to fit comfortably within the hollow interior and be parallel to the top wall and the bottom wall so that when activated, the plate will push downwardly, toward the bottom wall. In the event that a removable receptacle (25) is included in the third embodiment, the removable receptacle must be sized and shaped such that it fits within the hollow interior, and the compaction plate must be sized and shaped so that it fits comfortably within the removable receptacle when the compaction plate is actively compacting trash downwardly toward the bottom of the removable receptacle.

In the third embodiment, a means for operating the compaction plate is a conventional hydraulic cylinder (29) having a piston (30), the piston being attached distally from the cylinder to the compaction plate via suitable means such as a yoke or even permanently attached thereto via welding or similar means. The hydraulic cylinder is operably attached to a hydraulic pump (31) via hydraulic hoses (32). The hydraulic pump may easily be powered via electricity. Such hydraulic pumps and hydraulically operated pistons are exceedingly well known in throughout the arts, and should require no experimentation whatsoever to practice in connection with the instant invention. Though not shown, it may be practical to include a hydraulic fluid reservoir, as is further well known in the arts. This may also be placed within the second hollow body (28).

Obviously, in the case where a second hollow body is to be used to encase a portion of the compaction means, there must be an opening in both the bottom of the second hollow body (28) and the top wall (6) of the of the hollow body communicating between the interior of the second hollow body and the interior of the hollow body through which the cylinder (29) and/or piston (30) may extend.

In the third embodiment, it is believed most efficient to incorporate the form of receiving assembly described in connection with the second embodiment of the instant invention. As per FIGS. 6 and 7, when a receiving assembly of the "night depository door" type is incorporated, it is necessary to mount the receiving assembly in the front wall such that when the receiving assembly is in its closed position, the rear-most portion (33) of the receiving assembly (8) is spaced apart from the rear wall (12) sufficiently so that there is clearance space between the compaction plate (27) and the rear most portion (33) of the receiving assembly when the compaction plate is moving toward or away from the bottom wall (7). Depending upon the particular receiving assembly used in connection with the third embodiment of the instant invention, it may be useful to mount the receiving assembly in a third hollow body (41), thereby encasing the receiving assembly such that access to the hollow interior of the hollow body (2) for the deposit therein of trash may only be had by opening the receiving assembly. Furthermore, in such a case the trash loading space (21) will be within and defined by the third hollow body (41) and the receiving assembly (8). Also, in such a case the receiving assembly will be pivotably mounted to the third hollow body. Obviously, when mounting the receiving assembly to the third hollow body in the third embodiment, the third hollow body is mounted onto the hollow body (2) such that it is aligned with the first opening (9), thereby permitting articles placed within the trash loading space to pass into the hollow interior of the hollow body. The third hollow body must therefore have both an opening within which the receiving assembly may be mounted, and a rear opening communicating between the trash loading space and the hollow interior of the hollow body (2). In all other respects, the third embodiment is similar to the second embodiment.

The activation of the trash compaction means to produce compaction of trash located within the hollow interior (preferably within the removable receptacle, if same is utilized) may be accomplished through the use of a conventional manually operated electrical switch which will energize the hydraulic pump, or through any other suitable means such as a remotely operable electric switch or even in cooperation with an appropriate sensor which would activate the hydraulic pump when a pre-determined limit on the trash has been reached.

Clearly, while the third embodiment has been described as incorporating a conventional trash compaction means, a wide variety of analogous structures exist which could perform the same task. For example, in the U.S. Pat. No. 6,367,377, issued to Gawley et al. on Apr. 9, 2002, there is disclosed a trash compaction means of the scissors type which could easily be adapted to operate in the instant invention.

I claim:

1. A payment accepting trash receptacle comprising;

A. a hollow body,

I. the hollow body having a first opening, and a second opening,

II. the hollow body having an interior space,

B. a means for accepting payment,

I. the means for accepting payment being attached to the hollow body,

C. a receiving assembly,

I. the receiving assembly being mounted in the hollow body first opening and being configured such that when the receiving assembly is in an open position, a limited volume of trash may be placed within the receiving assembly and when the receiving assembly is in a closed position, trash placed within the receiving assembly falls directly into the interior space and no additional trash may be placed within the receiving assembly, D. a means for restricting access, I. the means for restricting access being operably connected to the means for accepting payment and cooperating with the receiving assembly to prevent any trash being placed within the receiving assembly until a payment is received by the means for accepting payment.

2. The payment accepting trash receptacle according to claim 1, further comprising;

A. the hollow body having a second opening for accessing the interior space,

B. the hollow body having a rear wall door sized and shaped to block access to the interior space, through the second opening.

3. The payment accepting trash receptacle according to claim 1 further comprising;

A. a removable receptacle,

I. the removable receptacle being sized and shaped to fit within the interior space.

4. The payment accepting trash receptacle according to claim 1 further comprising;

A. a third opening for accessing the means for accepting payment,

B. an access panel being sized and shaped to securely cover the third opening.

5. The payment accepting trash receptacle according to claim 1, the receiving assembly having a handle.

6. The payment accepting trash receptacle according to claim 1 further comprising;

A. the hollow body having a front wall, a rear wall, a left wall, a right wall, and a top wall, B. a rear wall projection, I. the rear wall projection extending downwardly and away from the rear wall, towards the front wall.

7. The payment accepting trash receptacle according to claim 6 further comprising, A. a baffle wall, I. the baffle wall extending from the front wall to the rear wall, B. the rear wall projection extending from the left wall to the baffle wall.

8. The payment accepting trash receptacle according to claim 7 further comprising;

A. a removable receptacle,

I. the removable receptacle being sized and shaped to fit within the hollow body interior space.

9. A payment accepting trash receptacle comprising;

A. a hollow body,

I. the hollow body having a first opening, and a second opening,

II. the hollow body having an interior space,

B. a means for accepting payment,

I. the means for accepting payment being attached to the hollow body,

C. a receiving assembly,

I. the receiving assembly being mounted in the hollow body first opening,

D. a means for restricting access,

I. the means for restricting access being operably connected to the means for accepting payment and the receiving assembly.

E. a trash compaction means,

I. the trash compaction means having a compaction plate, a. the compaction plate being sized and shaped to fit within the interior space.

10. The payment accepting trash receptacle according to claim 9 further comprising;

A. a third opening for accessing the means for accepting payment,

B. an access panel being sized and shaped to cover the third opening.

11. The payment accepting trash receptacle according to claim 10 further comprising;

A. a removable receptacle,

I. the removable receptacle being sized and shaped to fit within the interior space, II. the removable receptacle being sized and shaped to receive the compaction plate, B. the hollow body having a front wall, a rear wall, a left wall, a right wall, and a top wall, C. a rear wall projection, I. the rear wall projection extending downwardly and away from the rear wall, towards the front wall.

12. The payment accepting trash receptacle according to claim 11 further comprising, A. a baffle wall, I. the baffle wall extending from the front wall to the rear wall B. the rear wall projection extending from the left wall to the baffle wall.

13. The payment accepting trash receptacle according to claim 9, the receiving assembly having a handle.

14. The payment accepting trash receptacle according to claim 9 further comprising;

A. The hollow body having a plurality of tabs for fastening the hollow body to a base.

15. The payment accepting trash receptacle according to claim 9, further comprising;

A. the hollow body having a second opening for accessing the interior space,

B. the hollow body having a rear wall door sized and shaped to block access to the interior space, through the second opening.

16. A payment accepting trash receptacle comprising;

I. a hollow body, a. the hollow body having a first opening, and a second opening, b. the hollow body having an interior space, B. a means for accepting payment, I. the means for accepting payment being attached to the hollow body, C. a receiving assembly, I. the receiving assembly having a bottom wall, II. the receiving assembly having a flange attached to the bottom wall, III. the receiving assembly having a pair of vertical walls attached to both the bottom wall and the flange and perpendicularly disposed to both the bottom wall and the flange IV. the receiving assembly being movable as a unit relative to the hollow body, D. a means for restricting access, I. the means for restricting access being operably connected to the means for accepting payment and cooperating with the receiving assembly.

17. The payment accepting trash receptacle according to claim 16 further comprising;

A. the hollow body having a rear wall,

I. the rear wall having a rear wall projection, a. the rear wall projection extending from the rear wall, into the interior space, towards the front wall, b. the rear wall projection cooperating with the receiving assembly bottom wall, vertical walls and flange to limit the volume of trash which may be placed within the payment accepting trash receptacle when the receiving assembly is open, the trash within the receiving falling into the hollow interior and no additional trash capable of being placed within the receiving assembly when the receiving assembly is closed.

18. The payment accepting trash receptacle according to claim 17 further comprising;

A. a removable receptacle,

I. the removable receptacle being sized and shaped to fit within the interior space.

19. The payment accepting trash receptacle according to claim 18 further comprising;

A. a trash compaction means,

I. the trash compaction means having a compaction plate, a. the compaction plate being sized and shaped to fit within the interior space.

20. The payment accepting trash receptacle according to claim 16, further comprising;

A. the hollow body having a second opening for accessing the interior space,

B. the hollow body having a rear wall door sized and shaped to block access to the interior space, through the second opening.

* * * * *